(12) United States Patent
Kagawa

(10) Patent No.: US 6,567,360 B1
(45) Date of Patent: May 20, 2003

(54) CASE CONSTRUCTION OF MEMORY APPARATUS USING PORTABLE RECORDING MEDIUM

(75) Inventor: Shigeru Kagawa, Kawasaki (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/528,807

(22) Filed: Mar. 20, 2000

(30) Foreign Application Priority Data

Apr. 12, 1999 (JP) ............................................. 11-104475

(51) Int. Cl.⁷ .......................... G11B 33/02; G11B 33/12
(52) U.S. Cl. ...................................... 369/75.1; 361/685
(58) Field of Search .............................. 369/75.1, 75.2, 369/77.1, 77.2, 30.63, 31.01; 360/99.02, 99.03, 99.06, 99.07; 361/683, 684, 685, 686, 724, 725, 726, 727

(56) References Cited

U.S. PATENT DOCUMENTS

| 4,380,782 A | * | 4/1983 | Hirose et al. ................ 360/133 |
| 4,620,249 A | * | 10/1986 | Suzaki et al. .................. 360/71 |
| 5,524,104 A | * | 6/1996 | Iwata et al. .................. 361/685 |
| 5,886,869 A | * | 3/1999 | Fussell et al. ............... 360/900 |
| 6,095,445 A | * | 8/2000 | Hentrich ................... 242/332.4 |

FOREIGN PATENT DOCUMENTS

| JP | 58115653 | 7/1983 | |
| JP | 6013381 | 1/1985 | |
| JP | 190116 | 6/1989 | |
| JP | 362389 | 3/1991 | |
| JP | 3185797 | 8/1991 | |
| JP | 3273588 | 12/1991 | |
| JP | 4-90183 | * | 3/1992 |
| JP | 4341982 | | 11/1992 |
| JP | 594732 | | 4/1993 |
| JP | 5298550 | | 11/1993 |
| JP | 5298813 | | 11/1993 |
| JP | 6139767 | | 5/1994 |
| JP | 87560 | | 1/1996 |
| JP | 8-138476 | * | 5/1996 |
| JP | 822071 | | 8/1996 |
| JP | 8279242 | | 10/1996 |
| JP | 8-315557 | * | 11/1996 |
| JP | 963167 | | 3/1997 |
| JP | 10125050 | | 5/1998 |
| JP | 11-20560 | * | 1/1999 |

* cited by examiner

Primary Examiner—David L. Ometz
(74) Attorney, Agent, or Firm—Greer, Burns & Crain, Ltd.

(57) ABSTRACT

A case construction of a memory apparatus using a portable recording medium is improved so as to render the memory apparatus compact in size and to improve an assembling property. The memory apparatus using the portable recording medium comprises an upper outer case, a lower outer case, a drive device for driving the recording medium, an inner bottom case fitted onto the lower outer case, a top cover for covering the upper part of the inner bottom case, a power source unit disposed in the inner bottom case, and a holder for fitting the drive device to the inner bottom case. A separator interposed as a safety component between the power source unit and the drive device is defined by extending upward the wall surface of the holder on the side of the power source unit. In this construction, the holder holds the drive device through a leaf spring and, in order to allow a part of the holder to function as a heat sink, the distal end portion of the wall surface functioning as the separator may be extended in such a manner as to cover the upper portion of the power source unit.

11 Claims, 12 Drawing Sheets

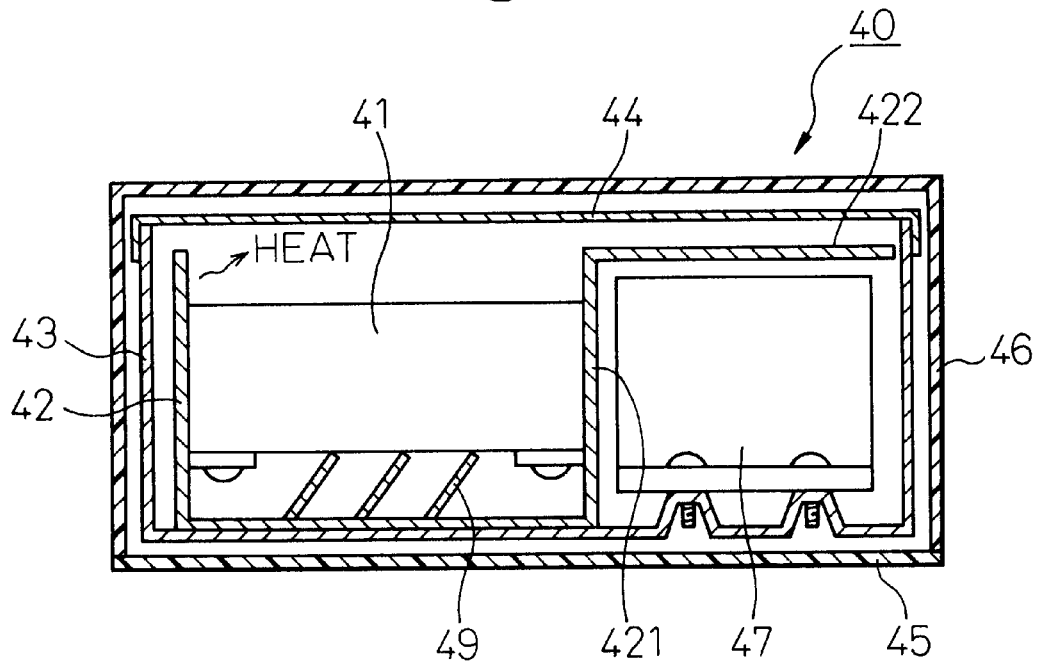
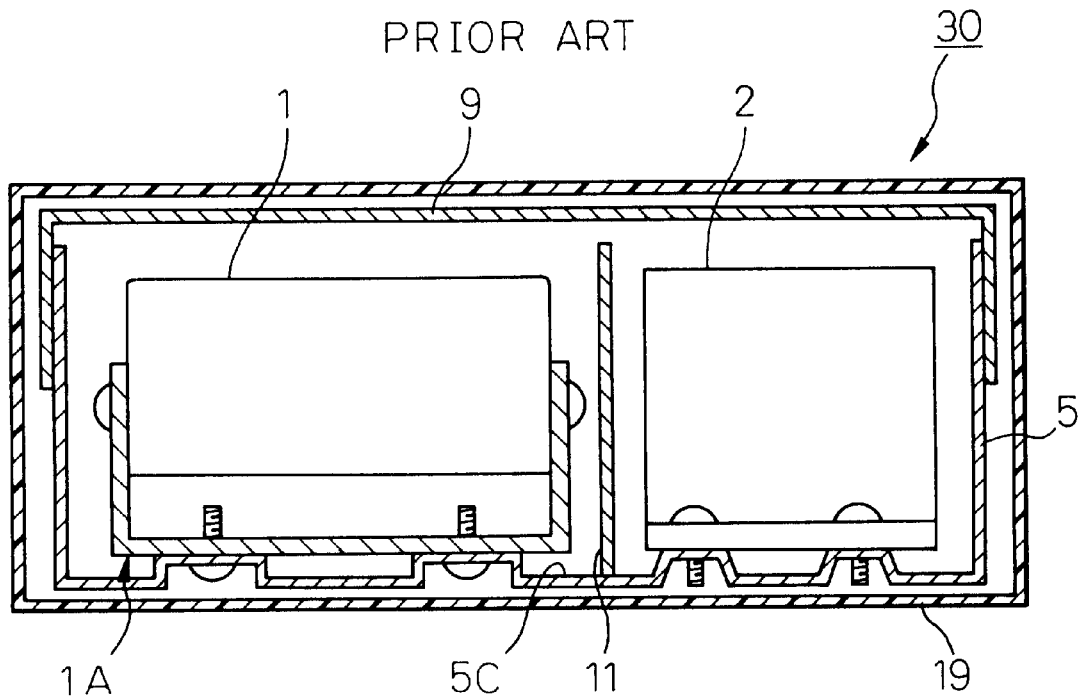

CASE CONSTRUCTION OF MEMORY APPARATUS USING PORTABLE RECORDING MEDIUM

BACKGROUND OF THE INVENTION

1. Field of the Invention

This invention relates to a case construction of a memory apparatus. More specifically, this invention relates to a case construction of a recording medium using a portable recording medium, such as an optical disk drive that is built into, or is mounted, from the outside on, a personal computer, a work station, and so forth.

2. Description of the Related Art

As office automation (OA) has spread widely in recent years, the size of OA appliances and their production cost have been reduced. Optical disk drives are used nowadays as external memory apparatuses for computers in place of magnetic disk drives. The optical disk drives, too, must be small in size and light in weight, and must be produced at a low cost. In the memory apparatuses such as the optical disk drives, their components must be reduced and/or integrated together, and must have high heat-radiation performance.

The memory apparatus according to the prior art, such as an optical disk drive, includes a bathtub-shaped metallic inner case accommodating therein a disk drive, a power source unit, an electric fan unit, etc, a top cover formed of a metallic flat sheet and disposed in such a manner as to cover the top opening of the inner case, a front bezel fitted to the front surface of the inner case and an outer case covering the inner case and the top cover. A separator formed of a sheet metal is interposed between a region in which the disk drive is accommodated and a region in which the power source unit is disposed, inside the inner case.

An optical disk loading port, an air hole for sucking external air into the memory apparatus, an eject switch of the optical disk and a busy lamp showing that the optical disk is in operation are provided on the front bezel. The air sucked from the air hole into the memory apparatus is discharged from an exhaust port by the electric fan unit and restricts the temperature rise of the disk drive and the power source unit. The disk drive is fitted to a bracket disposed on the bottom of the inner case through a frame.

However, the memory apparatus according to the prior art involves the following problems.

(1) A separator for separating the disk drive from the power source unit needs be disposed inside the case so as to satisfy safety standards. This separator results in the increase in the transverse width of the memory apparatus.

(2) The eject switch of the optical disk and the busy lamp are disposed separately by means such as caulking, bonding, and so forth. Therefore, the number of components is large, and the assembly work is troublesome and complicated.

(3) The disk drive is first fitted to the holder and is then fastened to the bottom of the inner case by screws. Therefore, the number of man-hours for the assembly work is large and the number of components is large.

(4) The separator is formed of a sheet metal, and welding is employed when the separator is fitted to the inner frame. Therefore, the number of man-hours for fitting the separator is large.

(5) The electric fan unit is used for dissipating the heat. Therefore, the number of components is large. Since wiring of cables is necessary, the size of the case becomes large.

SUMMARY OF THE INVENTION

It is an object of the present invention to provide a memory apparatus having a case construction that can solve the problems of the memory apparatuses according to the prior art, can reduce the size, the weight and the cost of production of the memory apparatus by decreasing the number of components while a counter-measure against heat is disposed inside the case.

To accomplish the object described above, the present invention provides a memory apparatus, using a portable recording medium, which memory apparatus comprises an outer case comprising an upper outer case and a lower outer case; a drive device for driving a recording medium; an inner case comprising an inner bottom case fitted onto the lower outer case and a top cover covering the upper part of the inner bottom case; a power source unit disposed inside the inner bottom case; and a holder for fitting the drive device to the inner bottom case; wherein a separator interposed as a safety component between the power source unit and the drive device is formed by extending upward the wall surface of the holder on the side of the power source unit.

According to the present invention, the holder for fitting the drive device to the lower outer case is provided with the separator function. Therefore, the separator can be omitted, and the width of the recording device can be reduced as the number of components is thus decreased.

In the present invention, a leaf spring is disposed on the support surface of the holder for holding the drive device, and the drive device is held by the holder through this leaf spring. In order to allow a part of the holder to function as a heat sink, the distal end portion of the wall surface of the holder that functions as the separator can be extended in such a manner as to cover the upper portion of the power source unit.

According to this arrangement, a space can be defined between the holder and the drive device, and the holder is extended toward the power source unit, increasing thereby the holder area. In consequence, the holder can be provided with the function of the heat sink, and heat radiation performance can be achieved.

In the present invention, a hook is disposed at a predetermined position of the lower outer case and a male anchor member is disposed at a position spaced apart by a predetermined distance from this hook. In the inner bottom case, on the other hand, an anchor hole is disposed at a position corresponding to the hook and a female anchor member is disposed at a position corresponding to the male anchor member. While the anchor hole of the inner bottom case is anchored to the hook of the lower outer case, the female anchor member of the inner bottom case is engaged with the male anchor member of the lower outer case so that the inner bottom case can be fitted to the lower outer case.

According to this arrangement, the inner bottom case accommodating therein the disk drive can be fitted to the lower outer case without using any screw, and the number of man-hours of the fitting work can be reduced.

Furthermore, in a memory apparatus of the type in which a medium eject switch and a busy lamp, that is turned ON during the read/write operation of the medium, are disposed on a circuit substrate of the drive device, while a medium eject mechanism for turning ON/OFF the medium eject switch and a display for displaying the light emitted from the busy lamp that is turned ON are disposed on a front bezel of the outer case, it is possible in the present invention to integrate the display with the medium eject mechanism, to dispose this integral medium eject mechanism on the front panel, and to constitute the medium eject mechanism by a mechanism main body biased toward the front panel by a spring and a transparent light guide member which is assembled into the mechanism main body and one of the ends of which is exposed on the surface side of the mechanism main body and the other end of which opposes the busy lamp and the medium eject switch.

Since the functions of the medium eject switch and the busy lamp can be accomplished by one switch mechanism according to this arrangement, the number of components and the occupying space on the front panel can be reduced.

When a swing door is provided to a recording medium loading port of the front panel of the outer case in the memory apparatus having the construction described above, a water guide path for discharging a liquid, that enters from the loading port, to both sides of the door can be provided on the back side of the swing door. At this time, another water guide path for guiding the liquid flowing out from the water guide path can be provided below both end portions of the water guide path of the swing door inside the outer case.

In this construction, when the liquid overflows to the outer case of the memory apparatus and enters the inside from the swing door of the loading port for the recording medium, the liquid flows to both sides of the swing door and is discharged. Therefore, invasion of the liquid into the memory apparatus can be prevented.

Furthermore, grooves for generating the flow of air inside the outer case can be formed round the outer periphery of the rotary portion of a spindle motor for rotating the recording medium loaded into the drive device.

According to this arrangement, the spindle motor functions as a substitute for the fan, and the electric fan unit becomes unnecessary. Therefore, the size, the weight, the number of components and the cost of production of the memory apparatus can be reduced.

BRIEF DESCRIPTION OF THE DRAWINGS

The present invention will be more clearly understood from the description as set forth below with reference to the accompanying drawings, wherein:

FIG. 6A is a sectional view of the memory apparatus, showing the structure of a separator according to the present invention;

FIG. 6B is a sectional view of the memory apparatus showing the construction of the devices shown in FIGS. 1 to 3;

DESCRIPTION OF THE PREFERRED EMBODIMENTS

Figure 2:
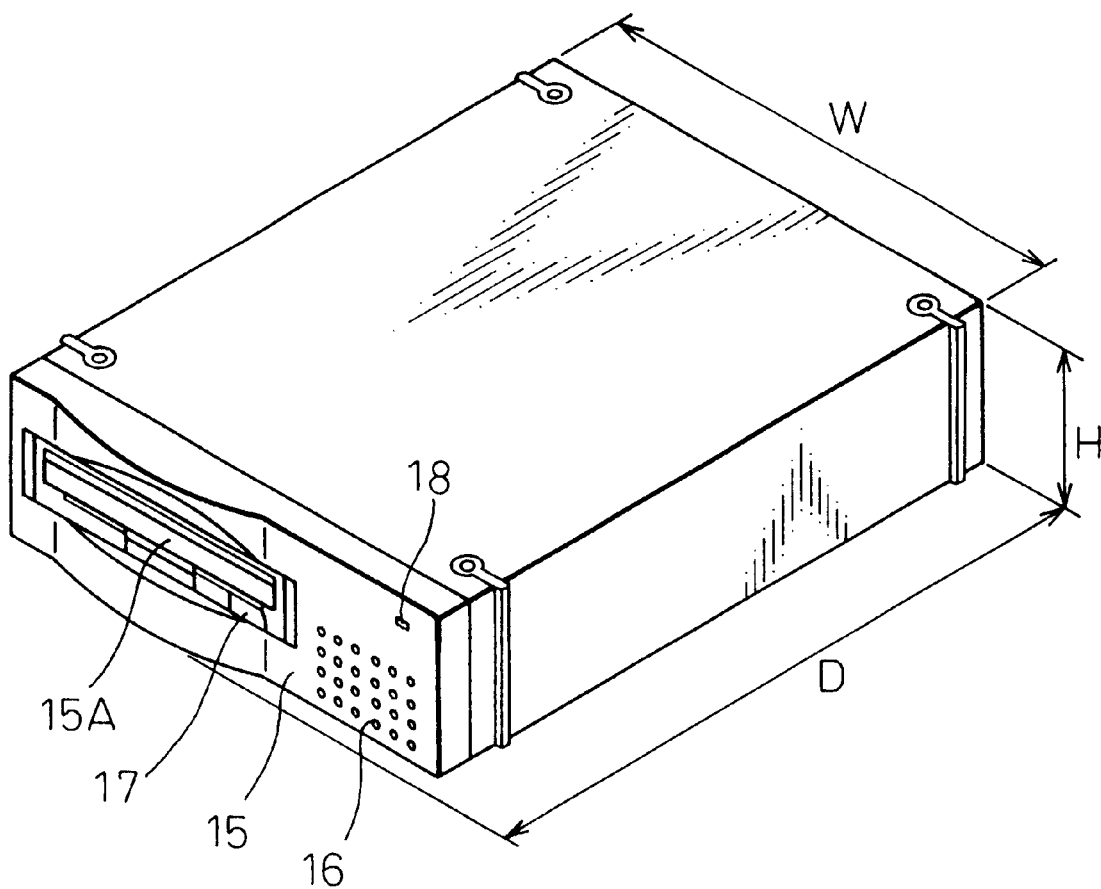
FIG. 2 is a perspective view showing the appearance of the stand-alone type optical disk drive of the prior art shown in FIG. 1 after it is assembled.
Figure 3:
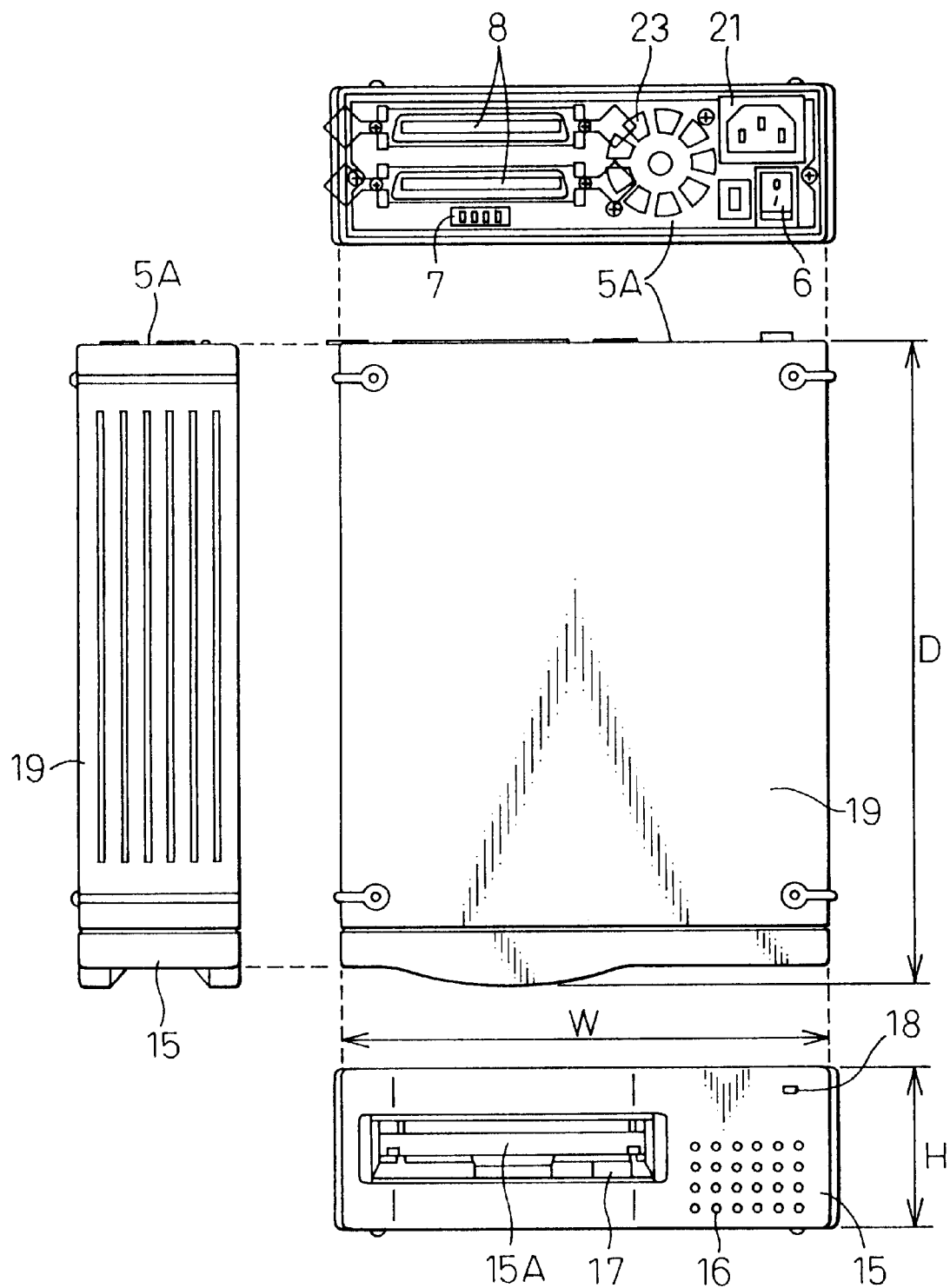
FIG. 3 is a plan view of the stand-alone type optical disk drive according to the prior art, its side view, its front view and its rear view.

Before describing the preferred embodiments, explanation will be given first on the case construction of a memory apparatus using a conventional portable recording medium shown in FIGS. 1 to 3.

Figure 1:
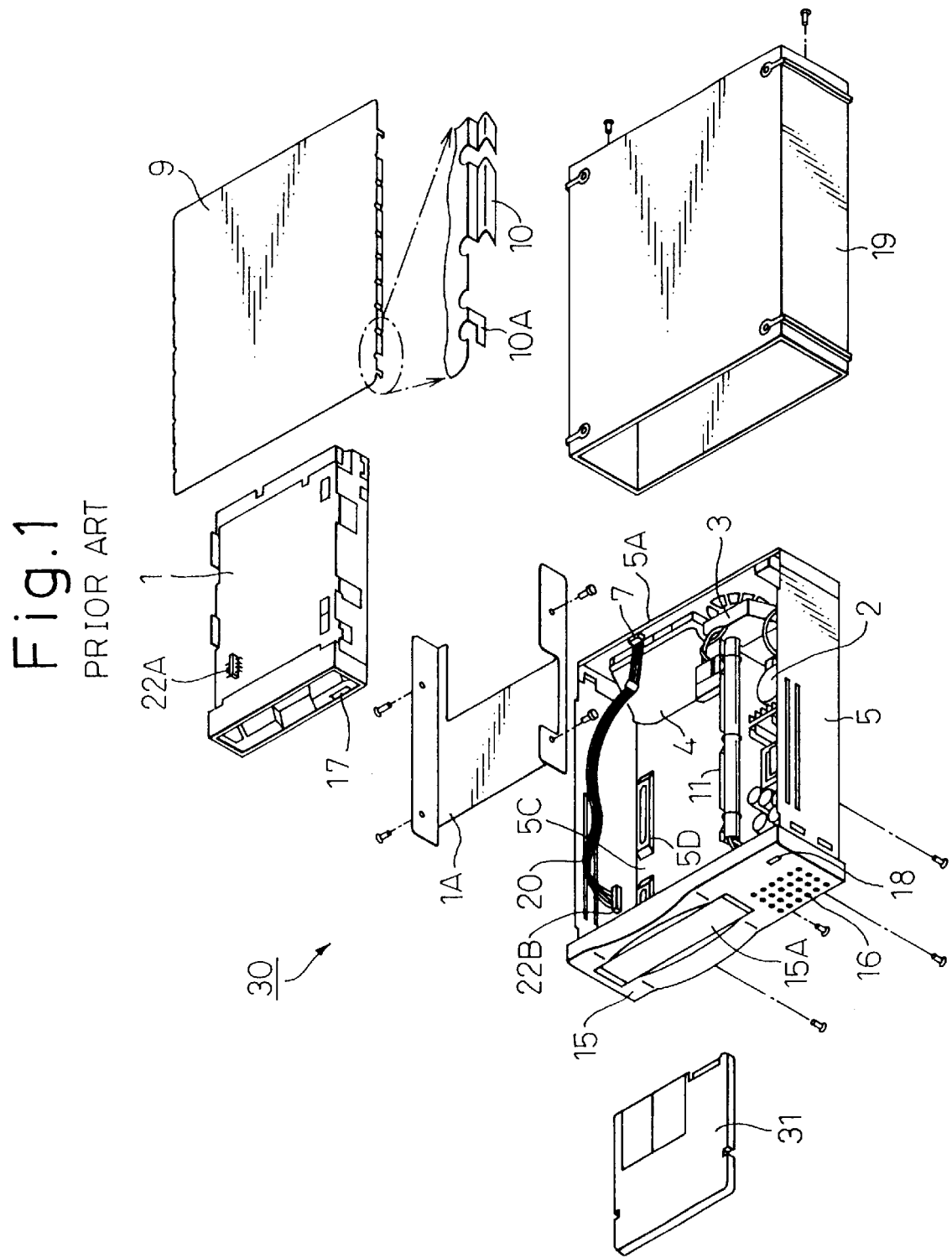
FIG. 1 is an exploded perspective view of a case showing a case construction of a stand-alone type optical disk drive as an example of a memory apparatus according to the prior art to the present invention.

FIG. 1 is an exploded perspective view of a case and shows a case construction of a stand-alone type optical disk drive 30 as an example of the memory apparatus according to the prior art to the present invention. FIG. 2 is a perspective view showing the appearance of the optical disk drive 30 shown in FIG. 1 after it is assembled. FIG. 3 is a plan view, a side view, a front view and a rear view of the stand-alone type optical disk shown in FIG. 2.

The optical disk drive 30 according to the prior art includes a metallic bathtub-shaped inner case 5 incorporating a disk drive 1, a power source unit 2, an electric fan unit 3, etc, a top cover 9 comprising a metallic flat sheet and so disposed as to cover the upper opening of this inner case 5, a front bezel 15 fitted to the front surface of the inner case 5 and an outer case 19 covering the inner case 5 and the top cover 9, as shown in FIG. 1. An SCSI (a general interface for small computers) is disposed on a substrate mounted to the disk drive 1. The front bezel 15 and the outer case 19 are molded from a resin material. A separator 11 is interposed between the region in which the disk drive 1 is accommodated and the region in which the power source unit 2 is disposed, inside the inner case 5. Reference numeral 20 denotes a signal cable equipped with a connector 22B that is connected to an external output connector 22A disposed on the top surface of the disk drive 1.

The inner case 5 is formed into the bathtub shape from a sheet metal in order to cope with EMI (electromagnetic interference). A power switch 6, a 4-bit dip switch 7, two SCSI connectors 8, an AC power inlet 21 and an exhaust hole 23 are disposed on the back plate 5A of the inner case 5 as shown in FIG. 3. A loading port 15A of an optical disk 31, an air hole 16 for sucking external air into the device, an eject switch 17 of the optical disk 31 and a busy lamp 18 representing that the optical disk is under operation are disposed on the front bezel 15. Air sucked into the device through the air hole 16 is discharged by the electric fan unit 3 from the exhaust hole 23, limiting the temperature rise of the disk drive 1 and the power source unit 2. The optical disk drive 30 of this embodiment has a width W of about 170 mm, a height H of about 55 mm and a depth D of about 225 mm.

AC power is supplied to the primary circuit of the power source unit 2 accommodated in the inner case 5 shown in FIG. 1 through the inlet 21, and is converted to DC power by the secondary circuit of the power source unit 2. This power source unit 2 supplies 5 V DC power to the disk drive 1 and to the control circuit, and supplies 12 V DC power to the electric fan unit 3. As this power source unit 2 supplies power, the disk drive 1 reads and writes data, and the electric fan unit 3 rotates and restricts the temperature rise, inside the inner case 5, generated by the power source unit 2.

The disk drive 1 is fitted through a frame 1A to the bracket 5D disposed on the bottom 5C of the inner case 5. The SCSI ID or other operation modes, required by a user are selected using the dip switch 7 connected through the signal cable 20. The disk drive 1 is connected to an external computer through an SCSI connector 8 of the back plate 5A of the inner case 5 connected through an interface cable 4.

To cope with the EMI, the top cover 9 is fitted in such a manner as to cover the upper opening of the inner case 5. Therefore, a large number of hook-shaped member 10 are disposed on both sides of the top cover 9 in its longitudinal direction. Reference numeral 10A denotes a positioning hook that is used when the top cover 9 is fitted to the inner case 5.

The memory apparatus 30 according to the prior art has the construction described above, and therefore involves the problems described in the foregoing paragraphs (1) to (5).

Figure 4:
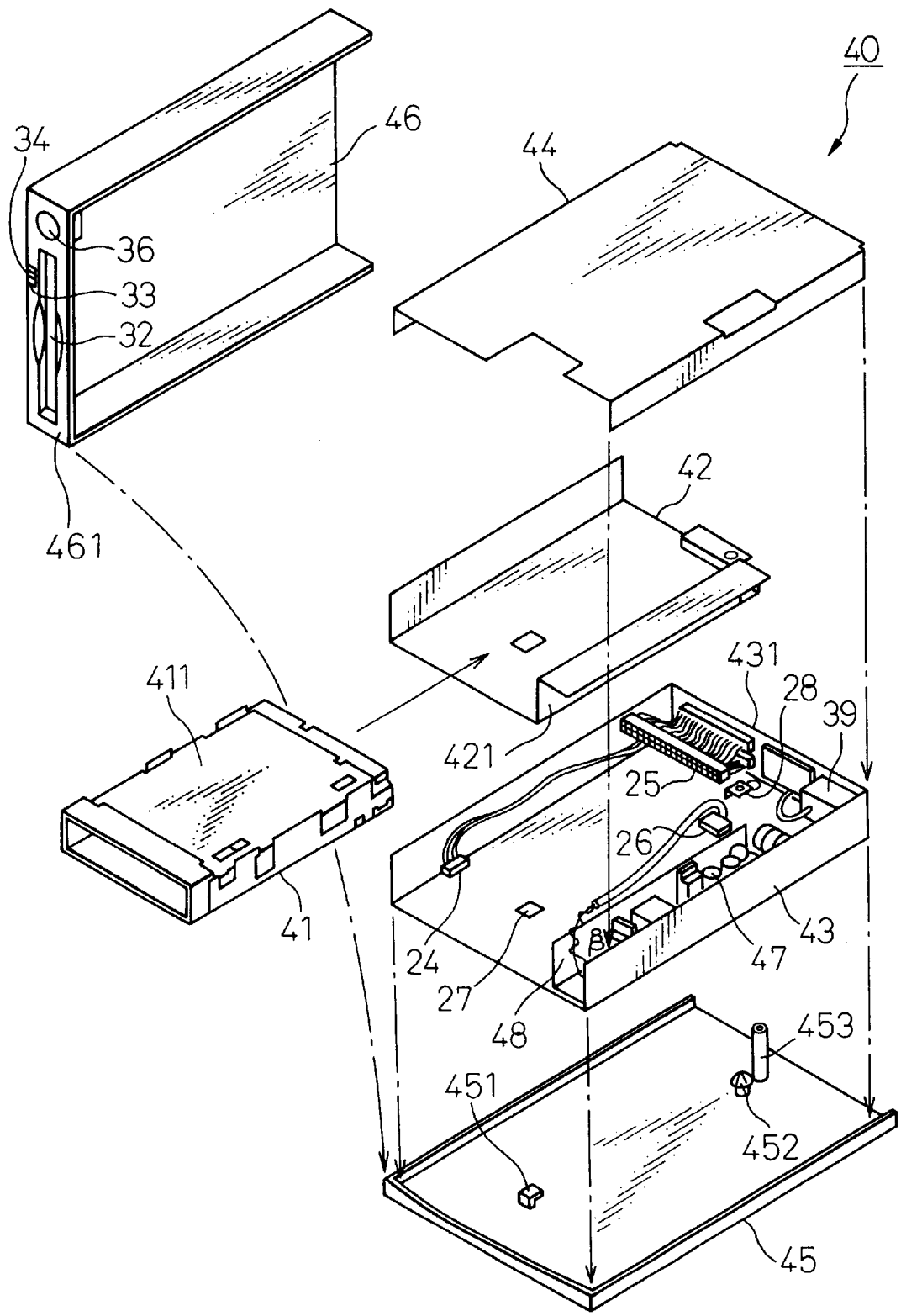
FIG. 4 is an exploded perspective view showing a case construction of a stand-alone type optical disk drive as an example of the memory apparatus according to one embodiment of the present invention.
Figure 5:
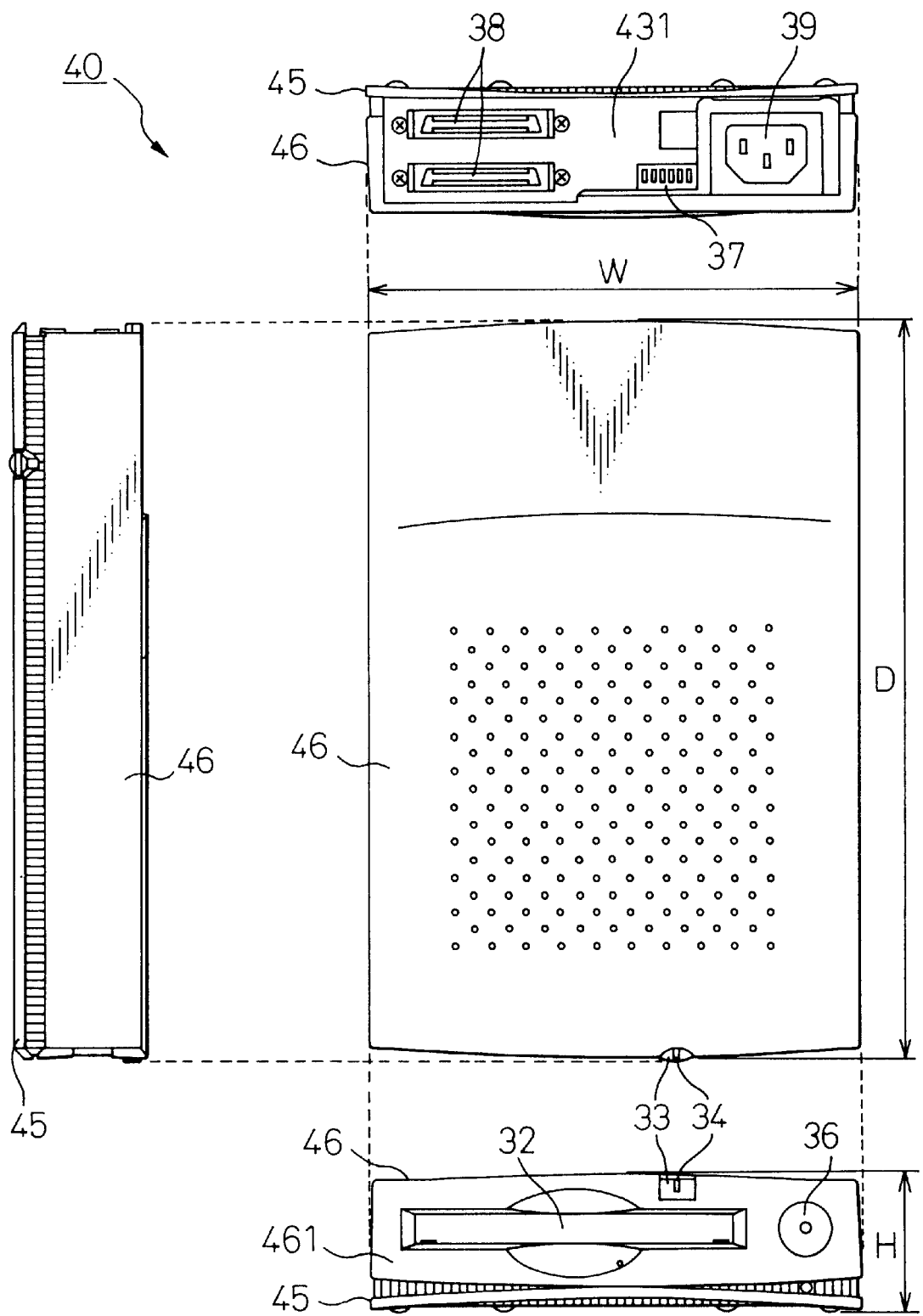
FIG. 5 is a plan view of the stand-alone type optical disk drive of FIG. 4 after its is assembled, its side view, its front view and its rear view.

FIG. 4 is an exploded perspective view showing a case construction of a stand-alone type optical disk drive 40 as an example of the memory apparatus using a portable recording medium according to the present invention. FIG. 5 is a plan view of the stand-alone type optical disk drive 40 shown in FIG. 4, its side view, its front view and its rear view.

As shown in FIG. 4, the optical disk drive 40 of the present invention includes a disk drive 41, a holder 42 of the disk drive 41, an inner bottom case 43 for accommodating the holder 41 having the disk drive 41 fitted thereto, a top cover 44 fitted to the upper part of the inner bottom case 43, a lower outer case 45 for fitting the inner bottom case 43 covered at the upper part thereof with the top cover 44, and an upper outer case 46 fitted onto the lower outer case 45. In this embodiment, the holder 42, the inner bottom case 43 and the top cover 44 are made of a metal, and the lower outer case 45 and the upper outer case 46 are made of a resin.

A hook 451 for placing and anchoring the inner bottom case 43 thereon, a snap fastener 452 as a male anchor member and a setting boss 453 are molded integrally with, and on, the bottom of the lower outer case 45.

Circuit components for controlling the disk drive mechanism and an interface circuit with external devices, etc, are mounted to a substrate 411 that is in turn mounted to the disk drive 41. The disk drive 41 is fitted to the inner bottom case 43 through a holder 42. A power source unit 47 is provided on the side of the portion of the inner bottom case 43 at which the disk drive 41 is provided. A separator as a safety component must be interposed between the region where the disk drive 41 is accommodated and the region where the power source unit 47 is disposed, inside the inner bottom case 43. In this embodiment, the side wall 421 of the holder 42 plays this separator function, too. An insulating sheet 48 is sandwiched between the power source unit 47 and the side wall 421 of the holder 42.

To cope with the EMI, the inner bottom case 43 is formed, from the sheet metal, into the bathtub shape. Connectors 24, 25 and 26 that are connected to the disk drive 41, and an engagement hole 27 and a bracket 28 engaging with the hook 451 and the snap faster 452 that are provided to the inner bottom case 43, respectively, are disposed inside the inner bottom case 43 besides the power source unit 47. The connectors 24 and 25 are connected to the back plate 431 of the inner bottom case 43. The connector 26 is connected to the power source unit 47 and supplies power to the disk drive 41.

A 6-bit dip switch 37, two connectors 38 for external connection and an AC inlet 39 are disposed on the back plate 431 of the inner bottom case 43 as shown in FIG. 5. The SCSI ID, and other operation modes required by the user, are selected using by the dip switch 37 connected through the connector 24. The disk drive 41 is connected to the external computer through the connectors 38 for external connection disposed on the back plate 431 of the inner bottom case 43 and connected through the connector 26.

A loading port 32 of the optical disk, a medium eject mechanism 33 and a power source button 36 are disposed on the front panel 461. In this embodiment, a busy button 34 representing that the optical disk is under operation is disposed inside the medium eject mechanism 33. The optical disk drive 40 of this embodiment has a width W of about 140 mm, a height H of about 40 mm and a depth D of about 210 mm. The external size is considerably smaller than that of the memory apparatus 30 according to the prior art explained with reference to FIG. 3.

AC power is supplied to the primary circuit of the power source unit 47 accommodated in the inner bottom case 43 shown in FIG. 4 through the inlet 39, and is converted to DC by the secondary circuit of the power source unit 47. The power source unit 47 supplies 5 V power to the disk drive 41 and the control circuit substrate 411. As power is supplied from the power source unit 47, the disk drive 41 writes and reads the data to and from the optical disk.

FIG. 6A shows the construction of the optical disk drive 40 according to the present invention. FIG. 6B shows the structure of the separator 11 in the optical disk drive 30 according to the prior art shown in FIGS. 1 to 3.

In the optical disk drive 30 according to the prior art, the separator 11 made of the sheet metal disposed in the longitudinal direction of the optical disk drive 30 separates the inside of the optical disk drive. In consequence, the power source unit 2 is separated by this separator 11 from other components such as the disk drive 1. FIG. 6B shows the section of the optical disk drive 30 in the transverse direction. The disk drive 1 is fitted to the inner case 5 under the state where it is held by the frame 1A. The power source unit 2 is disposed adjacent to the disk drive 1 inside the inner case 5. The separator 11 that protrudes from the bottom 5C of the inner case 5 is interposed between the disk drive 1 and the power source unit 2. This inner case 5 is accommodated inside the outer case 9 while it is covered with the top cover 9.

In the optical disk drive 40 according to the embodiment of the present invention shown in FIG. 6A, on the other hand, the separator interposed as the safety component between the power source unit 47 and the disk drive 41 is formed by extending upward the side surface 421 of the holder 42 of the disk drive 41 on the side of the power source unit 47. In this embodiment, a canopy portion 422, that is bent toward the power source unit 47, is provided to the upper end portion of the wall surface 421 on the side of the power source unit 47. This canopy portion 422 is so disposed as to cover the upper part of the power source unit 47.

The holder 42 for fitting the disk drive 41 to the lower outer case 45 is provided with the separator function as described above. Therefore, this embodiment can omit the separator, and can reduce the width of the optical disk drive 40 by decreasing the number of components. The holder 42 is extended toward the power source unit 47 and its area is increased. Therefore, the holder 42 can be provided with the function of a heat sink and can acquire a heat radiation effect.

In this embodiment, a leaf spring 49 is disposed on the surface of the holder 42 for supporting the disk drive 41, and the disk drive 41 is held by the holder 42 through this leaf spring 49. As a result, a space can be defined between the holder 42 and the disk drive 41, and since the heat of the disk drive 41 is transferred to the holder 42 through the leaf spring 49, the heat of the disk drive 1 can be dissipated.

Figure 7A:
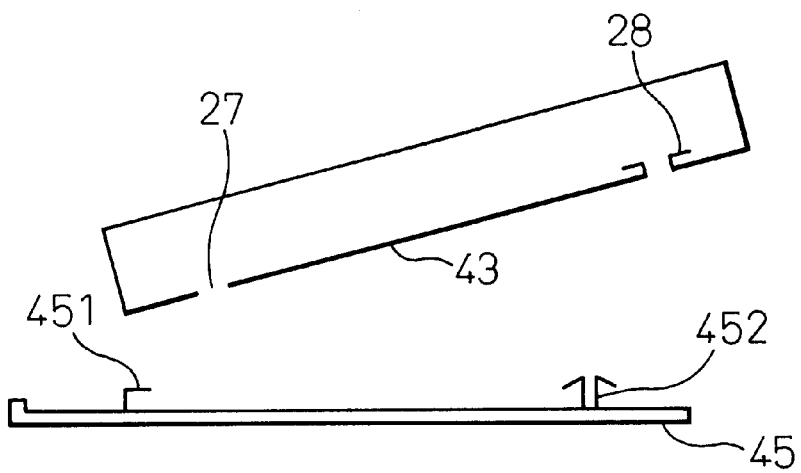
FIGS. 7A to 7C are explanatory views useful for explaining a step of mounting an inner bottom case, to which a drive device is fitted through a holder, to a lower outer case in the present invention.
Figure 7B:
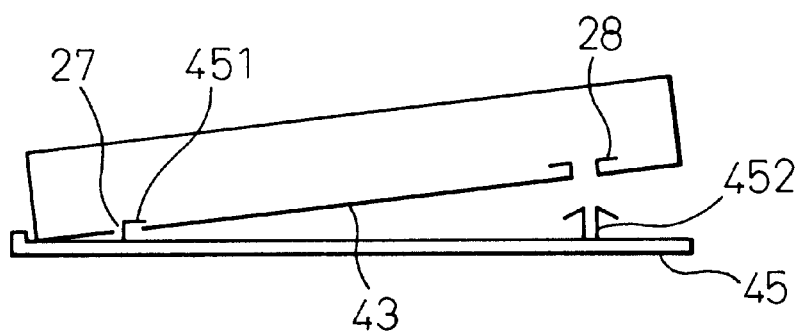
Figure 7C:
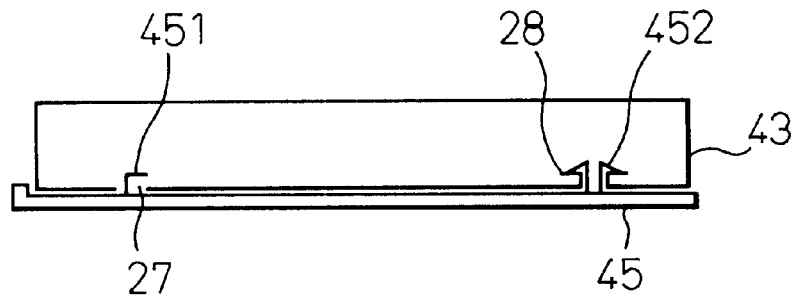

FIGS. 7A to 7C show the process steps when the inner bottom case 43, to which the disk drive 41 is fitted through the holder 42, is fitted to the lower outer case 45 according to the present invention.

As explained with reference to FIG. 4, the hook 451 is disposed at a predetermined position on the front side of the lower outer case 45, and the snap fastener 452 as the mail anchor member is disposed at a predetermined position on the rear side of the lower outer case 45 spaced apart by a predetermined distance from the hook 451. On the other hand, the anchor hole 27 is disposed in the inner bottom case 43 at the position corresponding to the hook 451, and the bracket 28 as the female anchor member is disposed at the position corresponding to the snap fastener 452.

To fit the inner bottom case 43 to the lower outer case 45, the disk drive 41 is first fitted to the inner bottom case 43 through the holder 42 into the state shown in FIG. 7A. Next, the anchor hole 27 of the inner bottom case 43 is anchored to the hook 451 of the lower outer case 45 as shown in FIG. 7B. The bracket 28 of the inner bottom case 43 is then positioned to the snap fastener 452 of the lower outer case 45 and is pushed from above. Consequently, the snap fastener 452 of the lower outer case 45 engages with the bracket 28 of the inner bottom case 43, so that the inner bottom case 43 can be fitted to the lower outer case 45 by a one-touch operation.

According to the construction of the present invention described above, the inner bottom case 43 can be fitted to the lower outer case 45 without a need for screws. Therefore, the number of the steps of fitting works can be decreased.

Figure 8A:
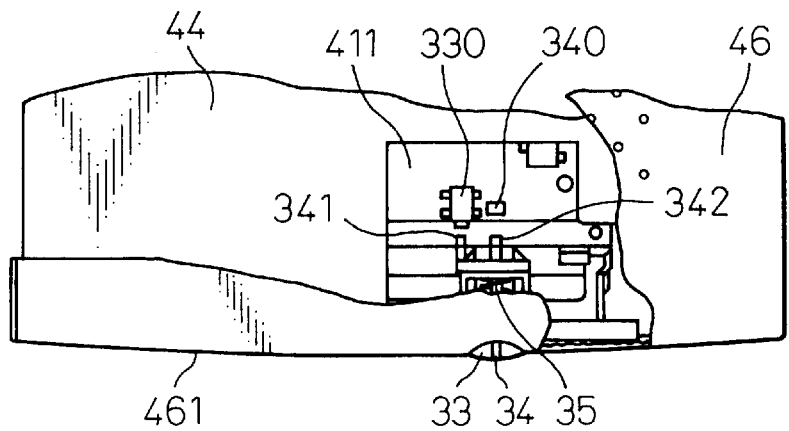
FIG. 8A is a fragmentary plan view, with portions broken away for clarify, of portions near a front panel of the memory apparatus of the present invention.
Figure 8B:
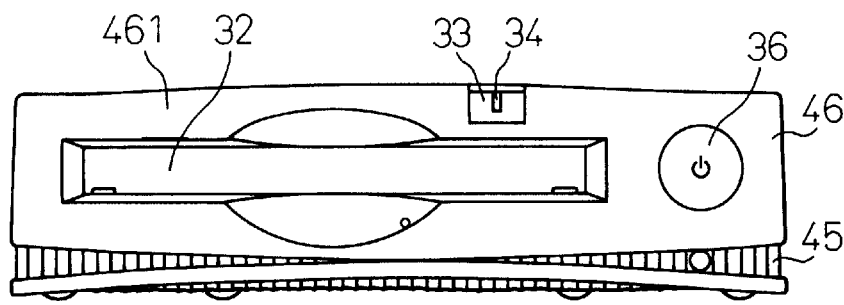
FIG. 8B is a front view of the front panel of the memory apparatus of the present invention.

FIGS. 8A to 8D and FIGS. 9A and 9B show the constructions of the medium eject mechanism 33 and the busy indicator 34 of the optical disk drive 40 according to the present invention. The medium eject mechanism 33 equipped with the busy indicator 34 is arranged above the disk loading port 32 provided to the front panel 461 of the upper outer case 46 as shown in FIG. 8B. The medium eject switch 330 and the busy lamp 340 are disposed on the substrate 411 at the back of the medium eject mechanism 33 equipped with the busy indicator 34, as shown in FIG. 8A. This substrate 411 is formed on the upper surface of the disk drive 41 as explained with reference to FIG. 4.

The busy indicator 34 is made of a transparent resin. The end portion of a main shaft 342 of this busy indicator 34 is so arranged as to oppose the busy lamp 340. The busy indicator 34 is equipped with a sub-shaft 341 that is in parallel with the main shaft 342. The end portion of this sub-shaft 341 is so arranged as to oppose the medium eject switch 330.

Figure 8C:
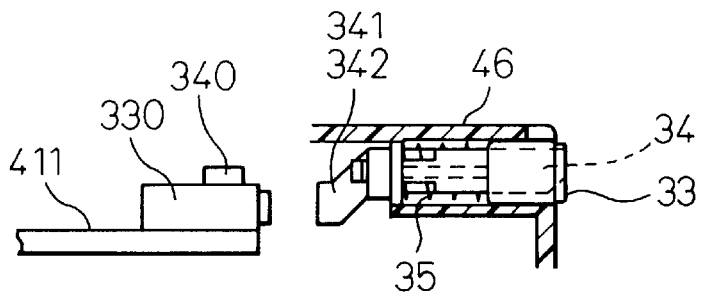
FIG. 8C is a partial sectional view useful for explaining the positional relationship between a busy lamp and a medium eject switch in FIG. 8A.
Figure 8D:
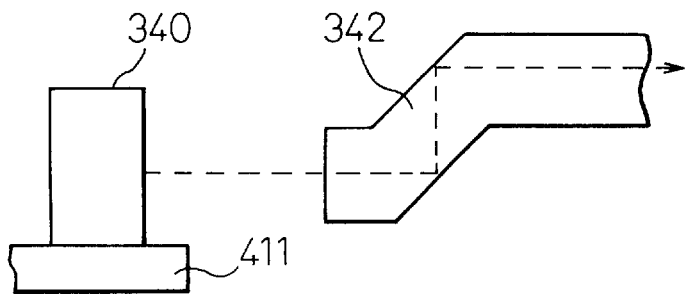
FIG. 8D is an explanatory view useful for explaining an optical path of the rays of light emitted from the busy lamp inside a light guide member.

The fitting position of the medium eject mechanism 33 equipped with the busy indicator 34 is different, in practice, from the fitting positions of the medium eject switch 330 and the busy lamp 340 on the substrate 411. Therefore, the distal end of each of the main shaft 341 and sub-shaft 342 is bent as shown in FIG. 8C so that the end portions of both main shaft 341 and sub-shaft 342 are positioned in front of the medium eject switch 330 and the busy lamp 340. Therefore, when the busy lamp 340 is lit, the rays of light from the busy lamp 340 are refracted inside the main shaft and reach the busy indicator 34 as shown in FIG. 8D. Since the medium eject mechanism 33 equipped with the busy indicator 34 is biased by the spring 35, the end portions of both main shaft 341 and sub-shaft 342 ordinarily exist at positions spaced apart from the medium eject switch 330 and the busy lamp 340.

Figure 9A:
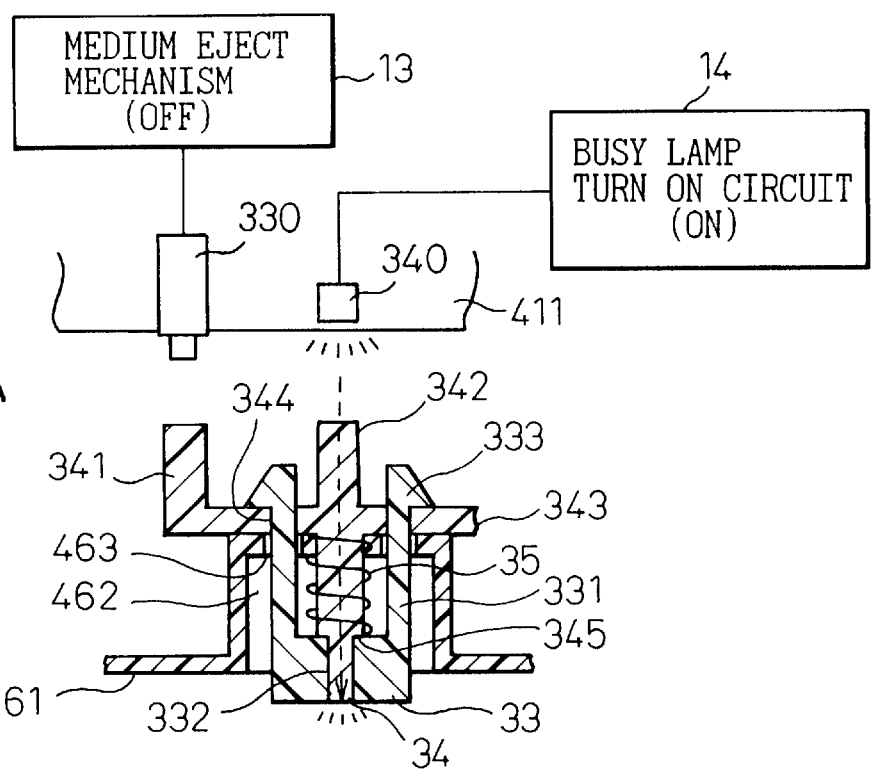
FIG. 9A is a partial enlarged sectional view showing the operation at the time of ON of the busy lamp of a medium eject mechanism in one embodiment of the present invention.

FIG. 9A shows in further detail the construction of the medium eject mechanism 33 equipped with this busy indicator 34. A cavity 462 is defined at the position of installation of the medium eject mechanism 33, equipped with the busy indicator 34, of the front panel 461. Three through-holes 463 are bored in the bottom surface of this cavity 462, and the main shaft 342 of the busy indicator 34 is inserted through the center through-hole 463 from the back.

The medium eject mechanism 33 includes at it center a through-hole 332 into which the distal end portion of the main shaft 342 of the busy indicator 34 is inserted. Two legs 331 protrude from both end portions of the medium eject mechanism 33 on the back surface side. An anchor pawl 333 is provided to the distal end of each leg 331. On the other hand, a step portion 345 is formed at the distal end of the main shaft 342 of the busy indicator 34. The distal end of this step 345 is pointed so that it can be inserted through the through-hole 332 of the medium eject mechanism 33. Arms 343 are provided on both sides of the inner portion of the front panel 461 in the main shaft 342. The sub-shaft 341 protrudes from one of the ends of this arm 343. A through-hole 344 is formed in each of these arms 343 so that the legs 331 of the medium eject mechanism 33 can be inserted into these through-holes 344, respectively.

When the medium eject mechanism 33 equipped with the busy indicator 34 is assembled, the main shaft 342 of the busy indicator 34 is first inserted through the center through-hole 463 from the back of the cavity 462. The main shaft 342 can be inserted up to the position of the arms 343. Next, the spring 35 is fitted to the main shaft 342 of the busy indicator 34, and the medium eject mechanism 33 is fitted from the surface side of the cavity 462. The medium eject mechanism 33 is fitted into the cavity 462 by inserting the distal end of the main shaft 343 of the busy indicator 34 through its through-hole 332 while the legs 331 are being inserted through the through-hole 463 formed in the bottom of the cavity 462 and through the through-hole 344 of the arm 343 at the back of the cavity 462.

When the legs 331 of the medium eject mechanism 33 are inserted into the through-holes 344 of the arms 343 in a predetermined length, the anchor pawls 333 at the distal end of the legs 331 penetrate through the arms 343. In consequence, the busy indicator 34 is anchored to the medium eject mechanism 33, and the medium eject mechanism 33 does not fall off. Under this state, the bottom of the medium eject mechanism 33 coincides with the position of the step 345 formed on the main shaft 342 of the busy indicator 34. Thereafter, when the medium eject mechanism 33 is pushed, the medium eject mechanism 33 moves integrally with the busy indicator 34.

FIG. 9A shows the state where the medium eject mechanism 33 is not pushed. When the write operation to the optical disk is executed under this state, a busy lamp turn-on circuit 14 connected to the busy lamp 340 is turned ON and the busy lamp 340 is turned ON, too. The light emitted from the busy lamp 340 enters the main shaft 342 and is refracted and travels inside the main shaft. Consequently, the busy indicator 34 is lit.

Figure 9B:
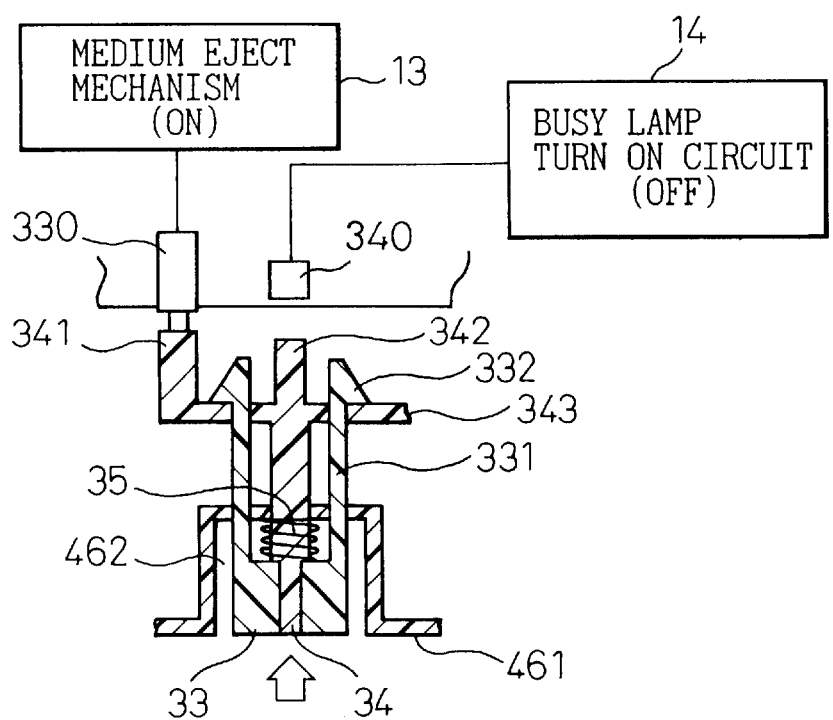
FIG. 9B is a partial enlarged sectional view showing the medium eject operation of the medium eject mechanism in FIG. 9A.

FIG. 9B shows the state where the medium eject mechanism 33 is pushed. When the medium eject mechanism 33 is pushed, the indicator 34 moves integrally with the medium eject mechanism 33. Therefore, the sub-shaft 341, that protrudes from the main shaft 342 of the busy indicator 34 through the arm 343, pushes the medium eject switch 330. As a result, the medium eject mechanism 33 connected to the medium eject switch 340 is turned ON, and the eject operation of the optical disk is executed. Since the write/read operation to and from the optical disk is not executed at this time, the busy lamp turn-on circuit 14 is OFF and the busy lamp 340 is not lit.

Because the present invention can accomplish the functions of the medium eject mechanism 33 and the busy indicator 34 by one switch button, the present invention can reduce the number of components and the occupying space on the front panel.

Figure 10A:
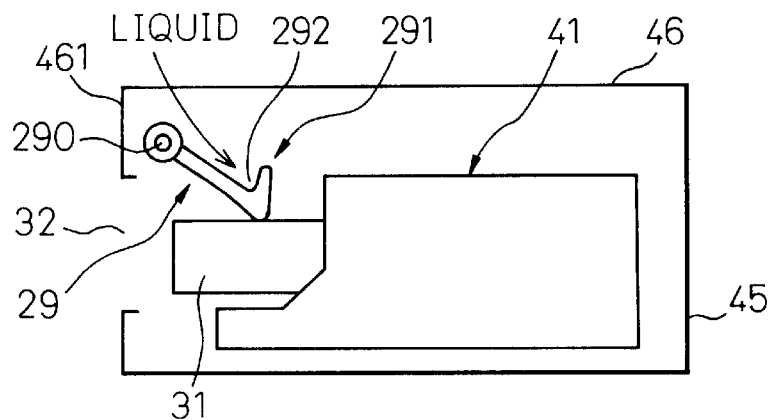
FIG. 10A is an explanatory view showing the operation when a medium is loaded into a swing door in the present invention.
Figure 10B:
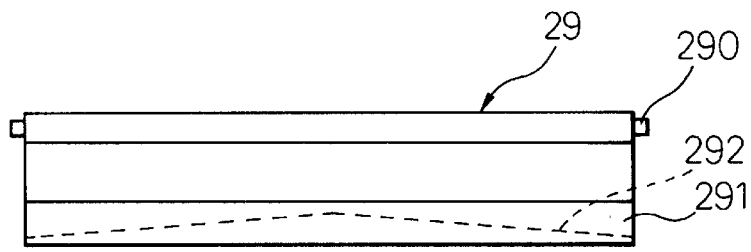
FIG. 10B is a rear view showing the construction of an example of the swing door shown in FIG. 10A.

FIGS. 10A and 10B show the construction of the swing door 29 disposed at the depth of the loading port 32 of the optical disk formed in the front panel 461 of the present invention.

Figure 10C:
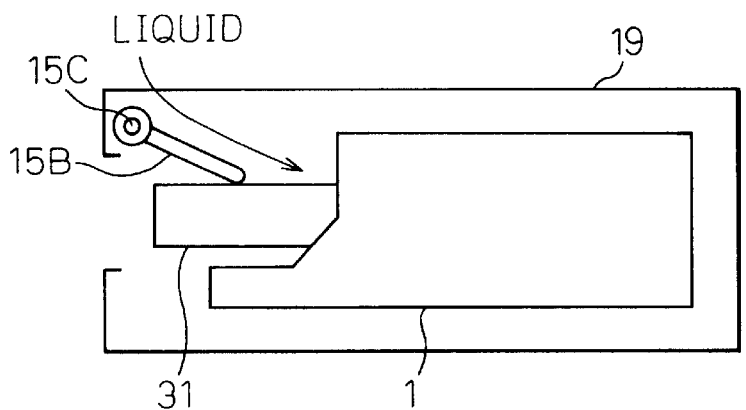
FIG. 10C is an explanatory view showing the operation when the medium is loaded into the swing door in the prior art.

The swing door 15B for preventing invasion of dust, etc, into the optical disk drive is generally provided to the loading port of the optical disk in the conventional optical disk drives, as shown in FIG. 10C. When the optical disk 31 is loaded into the disk drive 1, this swing door 15B rotates with the rotary shaft 15C as the center. When liquid, etc, enters from the loading port of the optical disk while the swing door 15B is open in the construction of the conventional swing door 15B, however, the liquid is guided by the swing door 15B, enters the optical disk drive, and may damage the optical disk 31 and the disk drive 1.

Therefore, in the construction in which the swing door 29 rotated by the rotary shaft 290 is provided to the loading port for the optical disk on the front panel 461 of the upper outer case 46, the present invention defines a water guide path 292 that is defined by a rib 291 on the back of the swing door 29 in order to discharge the liquid entering from the loading port to both sides of the swing door 29. This water guide path 292 is formed in such a fashion that the depth of the groove becomes progressively deeper from the center of the swing door 29 toward its both sides.

According to this construction, even when the liquid enters from the optical disk loading port of the front panel 461 of the upper outer case, the liquid is allowed to flow toward both sides of the switching door 29. In consequence, invasion of the liquid into the optical disk drive can be prevented.

Figure 11:
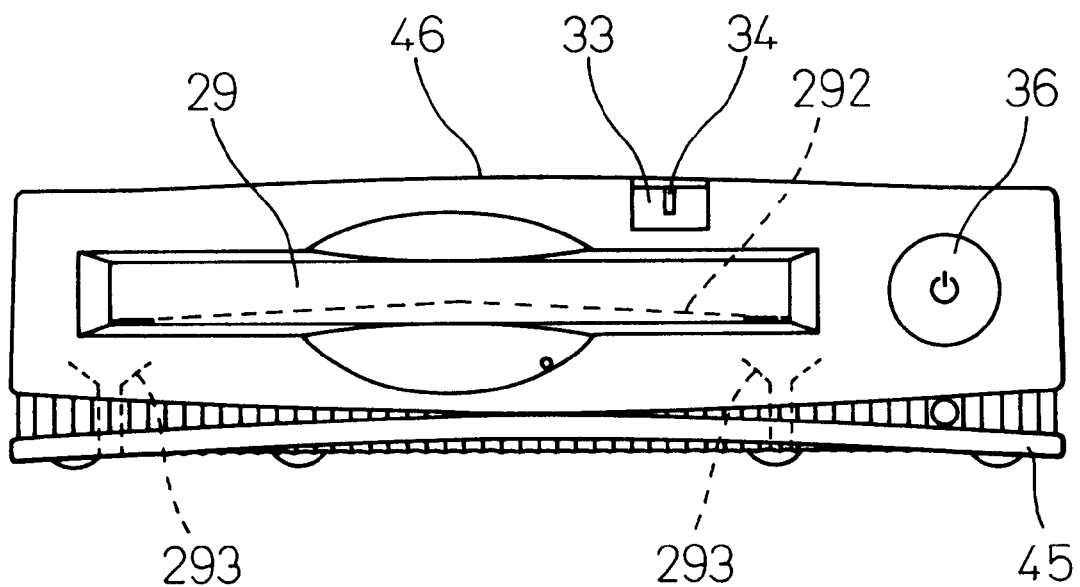
FIG. 11 is a front view of the memory apparatus, showing the position of liquid discharge mechanisms disposed on both sides of the swing door in the present invention.

In the construction in which the water guide path 292 is provided to the switching door 29, another water guide path 293 may be further disposed below both side portions of the water guide path 292 in order to guide the liquid flowing out from the water guide path to the outside of the lower outer case 45 as shown in FIG. 11. According to this construction, the liquid flowing out from the water guide path 292 can be completely discharged to the outside of the lower outer case 45.

Figure 12A:
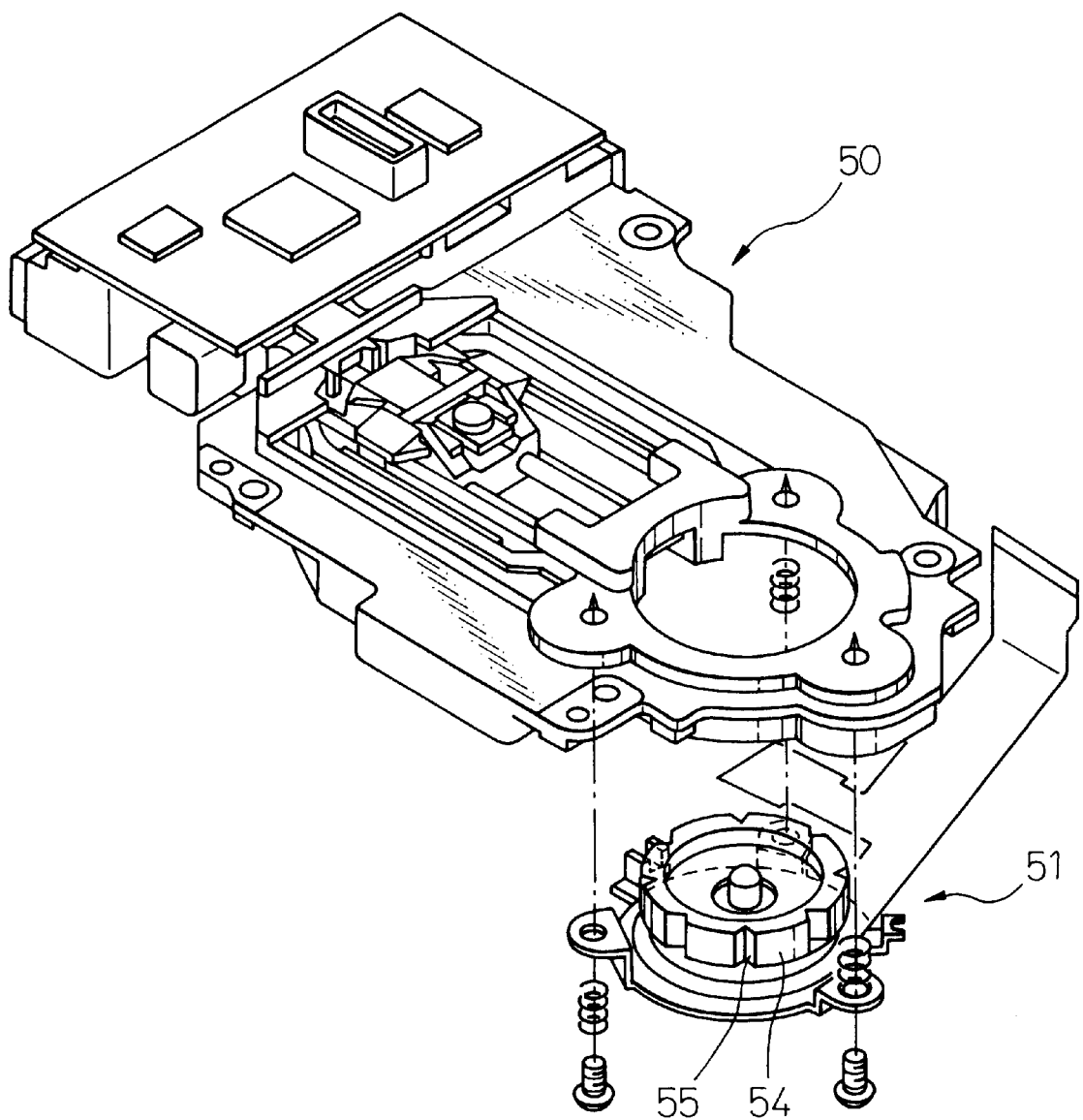
FIG. 12A is an assembly perspective view showing the first example of the construction of a spindle motor assembled in a drive device according to the present invention.

FIG. 12A shows the first example of the construction of the spindle motor 51 assembled in the disk drive of the present invention. This spindle motor 51 is for rotating the optical disk. In the first embodiment of the present invention, longitudinal grooves 55 are defined round the outer peripheral portion of the turn table 54 of the spindle motor 51 fitted to the moving optical system 50 that is disposed inside the disk drive. As a result, these longitudinal grooves 55 generate the flow of air inside the disk drive when the spindle motor 51 rotates, and this flow of air prevents the temperature rise inside the disk drive.

Figure 12B:
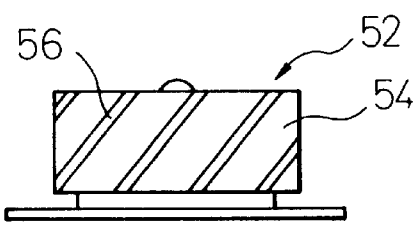
FIG. 12B is a side view showing the second example of the construction of the spindle motor according to the present invention.
Figure 12C:
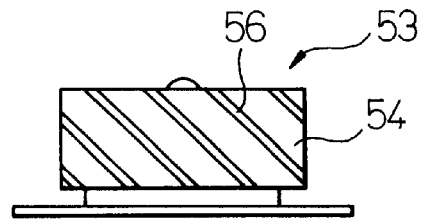
FIG. 12C is a side view showing the construction of the third example of the spindle motor according to the present invention.

In the first embodiment, the longitudinal grooves 55 are formed round the outer periphery of the turn table 54 of the spindle motor 51 as described above. However, skew grooves 56 may be formed in place of the longitudinal grooves 55 as in the spindle motor 52 of the second embodiment shown in FIG. 12B or in the spindle motor 53 of the third embodiment shown in FIG. 12C. The directions of the skew grooves 56 are different between the spindle motors 52 and 53 of the second and third embodiments. Therefore, the direction of the flow of air is different between the spindle motors 52 and 53 of the second and third embodiments when these motors rotate.

AS the grooves are formed on the outer peripheral surface of the turn table of the spindle motor, the spindle motor functions as a substitute for the fan, and the electric fan unit becomes unnecessary. Therefore, the memory apparatus can be rendered more compact, and the number of components as well as the cost of production can be reduced.

Although the embodiments described above deal with the optical disk drive, the present invention can be also applied effectively to other disk drives.

What is claimed is:

1. A memory apparatus using a removable recording medium, comprising:

a drive device for driving said recording medium equipped with a loading port for inserting or ejecting said recording medium;

a front panel, having a door at the position corresponding to said loading port;

an outer case of said memory apparatus; and an inner case on which said drive device is mounted;

a display for displaying light from a busy lamp which is turned on when said recording medium is being read or written is provided integrally with a medium eject button;

a circuit substrate of said drive device; and a medium eject switch provided on said circuit substrate and being turned ON/OFF by said medium eject button;

wherein said medium eject button for ejecting said recording medium from said drive device is provided on said front panel;

wherein at least a part of said medium eject button is made of a transparent light guide member which guides a light from said busy lamp to said display;

wherein said busy lamp is provided on said circuit substrate at the position facing said one end of said transparent light guide member; and said medium eject switch and said busy lamp are provided side by side on the circuit substrate.

2. A memory apparatus according to claim 1, wherein said medium eject button comprises:

in body biased toward said front panel by a spring;

a main shaft for guiding a light from said busy lamp to said main body; and a subshaft for turning ON/OFF said medium eject switch.

3. A memory apparatus according to claim 1, wherein said front panel is formed integrally with said outer case.

4. A memory apparatus according to claim 1, wherein a water guide path for discharging a liquid entering from said loading port to both sides of said door is provided on the back side of said door.

5. A memory apparatus according to claim 4, wherein another a water guide path for guiding said liquid flowing out from said water guide path to the outside of said memory apparatus is provided below both end portions of said water guide path of said door inside said memory apparatus.

6. A memory apparatus using a removable recording medium comprising:

an outer case comprising an upper outer case and a lower outer case;

a drive device for driving said recording medium;

an inner case comprising an inner bottom case fitted onto said lower outer case and a top cover covering the upper part of said inner bottom case;

a power source unit disposed in said inner bottom case; and a holder for holding said drive device to said inner bottom case;

wherein a separator interposed as a safety component between said power source unit and said drive device is defined by extending upward the wall surface of said holder on the side of said power source unit;

the distal end portion of the wall surface of said holder functioning as said separator is extended in such a manner as to cover the upper part of said power source unit, in order to allow a part of said holder to function as a heat sink;

a leaf spring is disposed on the support surface of said holder for holding said drive device, said drive device is held by said holder through said leaf spring;

a hook is provided at a predetermined position of said lower outer case, and a male anchor member is provided at a position spaced apart by a predetermined distance from said hook;

an anchor hole is formed in said inner bottom case at a position corresponding to said hook, and a female anchor member is provided at a position corresponding to said male anchor member;

said female anchor member of said holder is engaged with said male anchor member of said lower outer case under the state where said anchor hole of said holder is anchored to said hook of said lower outer case, so that said holder can be fitted to said lower outer case;

a loading port for inserting or ejecting said recording medium is equipped with said drive device for driving said recording medium;

a front panel having a door is provided at the position corresponding to said loading port is provided;

a medium eject button for ejecting said recording medium from said drive device is provided on said front panel;

a display for displaying light from a busy lamp which is turned on when said recording medium is being read or written is provided integrally with a medium eject button;

at least a part of said medium eject button is made of a transparent light guide member which guides a light from said busy lamp to said display;

a water guide path for discharging a liquid entering from said loading port to both sides of a door is provided on the back side of said door;

another water guide path for guiding said liquid flowing out from said water guide path to the outside of said memory apparatus is provided below both end portions of said water guide path of said door inside said memory apparatus; and grooves for generating a flow of air inside said outer case are provided to the outer periphery of a rotating portion of a spindle motor for rotating said recording medium loaded into said drive device.

7. A memory apparatus using a removable recording medium comprising:

a drive device for driving said recording medium equipped with a loading port for inserting or ejecting said recording medium;

a front panel, having a door at the position corresponding to said loading port;

a display for displaying light from a busy lamp which is turned on when said recording medium is being read or written is provided integrally with medium eject button;

a circuit substrate of said drive device; and a medium eject switch provided on said circuit substrate and being turned ON/OFF by said medium eject button;

wherein said medium eject button for ejecting said recording medium from said drive device is provided on said front panel;

wherein at least a part of said medium eject button is made of a transparent light guide member which guides a light from said busy lamp to said display;

wherein said busy lamp is provided on said circuit substrate at the position facing said one end of said transparent light guide member; and wherein said medium eject switch and said busy lamp are provided side by side on the circuit substrate.

8. A memory apparatus according to claim 7, wherein said medium eject button comprises:

a main body biased toward said front panel by a spring;

a main shaft for guiding a light from said busy lamp to said main body; and a subshaft for turning ON/OFF said medium eject switch.

9. A memory apparatus according to claim 7, wherein said front panel is formed integrally with an outer case.

10. A memory apparatus according to claim 7, wherein a water guide path for discharging a liquid entering from said loading port to both sides of said door is provided on the back side of said door.

11. A memory apparatus according to claim 10, wherein another water guide path for guiding said liquid flowing out from said water guide path to the outside of said memory apparatus is provided below both end portions of said water guide path of said door inside said memory apparatus.

* * * * *

UNITED STATES PATENT AND TRADEMARK OFFICE
CERTIFICATE OF CORRECTION

PATENT NO. : 6,567,360 B1  Page 1 of 1
DATED : May 20, 2003
INVENTOR(S) : Kagawa It is certified that error appears in the above-identified patent and that said Letters Patent is hereby corrected as shown below:

<u>Title page,</u>
Item [56], References Cited, FOREIGN PATENT DOCUMENTS, delete "822071" and insert -- 8222071 --.

<u>Column 11,</u>
Line 11, delete "in" and insert -- a main --.

Signed and Sealed this

Twenty-third Day of December, 2003

JAMES E. ROGAN
*Director of the United States Patent and Trademark Office*